April 24, 1934.   L. CAMPBELL, JR   1,955,846
BLOWPIPE
Filed Feb. 13, 1931   2 Sheets-Sheet 1
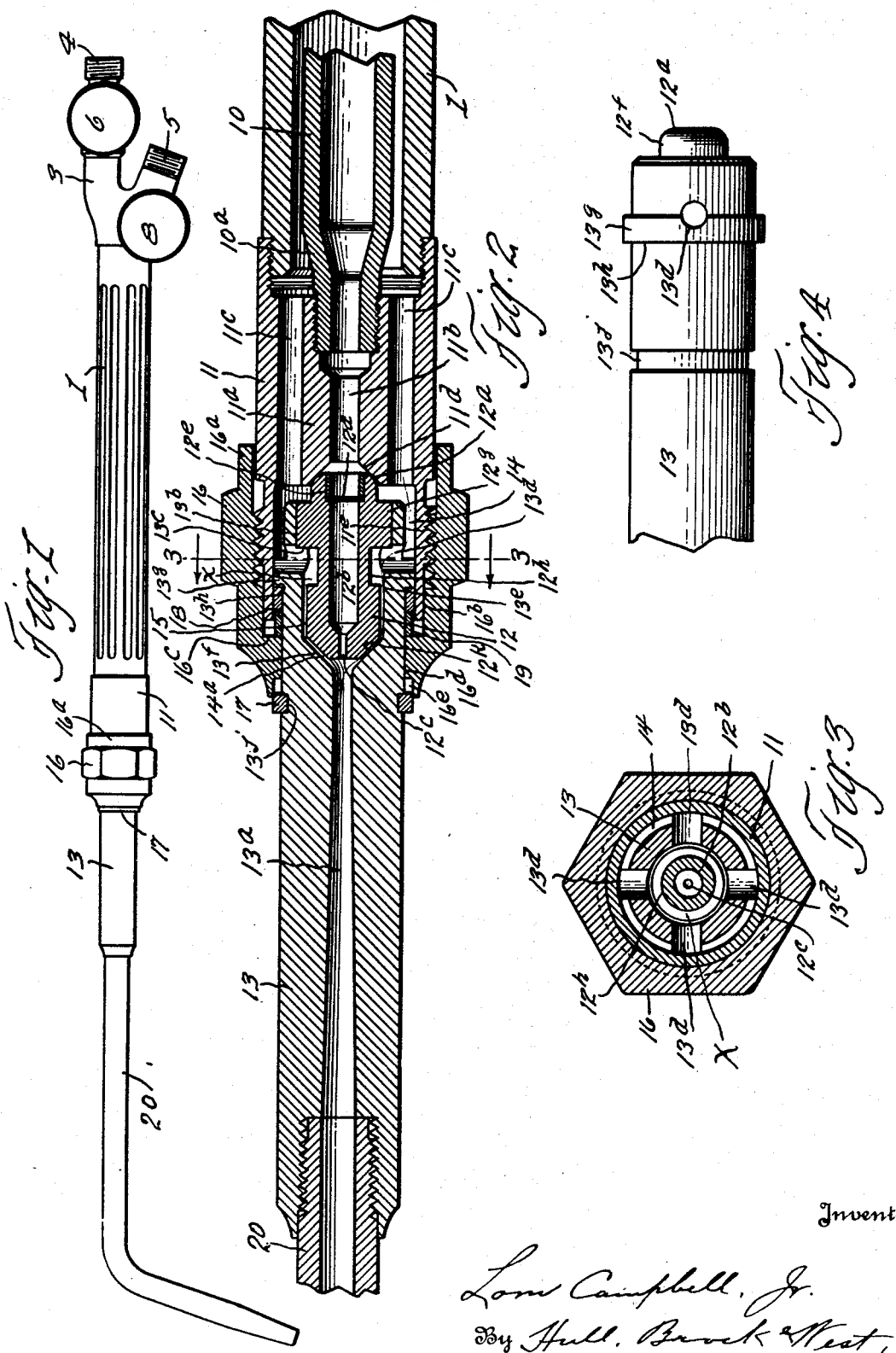
Inventor
Lou Campbell, Jr.
By Hull, Brock & West,
Attorneys

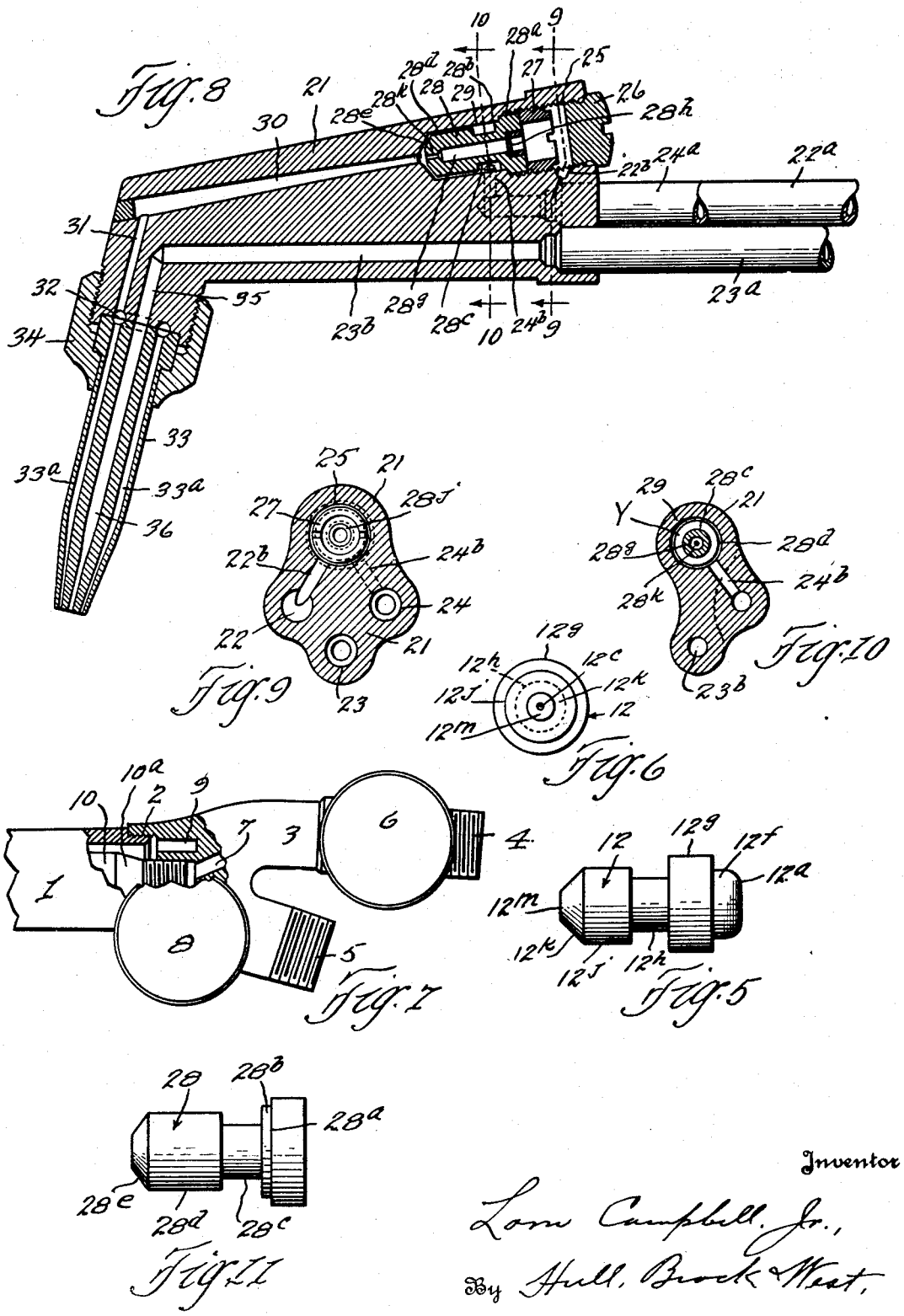

Patented Apr. 24, 1934

1,955,846

UNITED STATES PATENT OFFICE 1,955,846

BLOWPIPE

Lorn Campbell, Jr., Lakewood, Ohio

Application February 13, 1931, Serial No. 515,522

12 Claims. (Cl. 158—27.4)

This invention relates to what are known to the trade as low pressure welding and cutting blowpipes wherein, although the oxygen is supplied under a comparatively high pressure, the acetylene or other fuel gas is supplied under a pressure varying between four and six ounces per square inch.

While blowpipes of this low-pressure type possess certain advantages, these inherent advantages have been offset to a great extent by the liability of such blowpipes to backfire, the back-firing consisting in a burning back of the gaseous mixture within the blowpipe to a point where the oxygen and the fuel gas are mixed.
This phenomenon of back-fire is not only annoying to the operator but, in the case of welding, impa rs the quality of the weld, due to the necessity for repeated reheating of the metal. It also involves loss of time, due to the necessity for shutting off the blowpipe and then relighting it and reheating the metal. Furthermore, where the back-fire results in the production of intense heat within the blowp pe—as by frequent repetition of the back-firing or the prolongation of any particular backfire—corresponding injury will be inflicted upon the metal comprising the blowpipe.

One of the principal objects of my invention is to overcome this principal objection to the use of low-pressure blowpipes. A further important object of the invention is to construct the portion of the conduit for oxygen which is within the handle of a blowpipe in such manner as to prevent injury thereto, and particularly to the unions between the ends of this portion and the other portions with which such ends are connected. Further and more limited objects of the invention will be set forth in the description hereinafter; and all of the objects will be accomplished and realized in and through the construction and arrangement of parts shown in the accompanying drawings, wherein Fig. 1 represents a side elevation of a welding blowpipe having my invention incorporated therein; Fig. 2 a detail in longitudinal section through the front end of the handle and the adjacent portion of a mixing member preferably forming part of the tip assembly; Fig. 3 a detail in section corresponding to the line 3—3 of F g. 2; Fig. 4 an end elevation of the mixing member, the coupling nut being omitted; Fig. 5 a detail in side elevation and F.g. 6 a detail in end elevation of the injector shown in Figs. 2-4 inclusive; F g. 7 a detail in sectional elevation of the rear portion of the handle and the tail block connected thereto; Fig. 8 a longitudinal sectional view through a cutting blowpipe having my injector incorporated herewith; Figs. 9 and 10 are sectional views corresponding respectively to the lines 9—9 and 10—10 of Fig. 8; and Fig. 11 a side elevation of the injector shown in Figs. 8–10 inclusive.

Describing first in detail the parts shown in Figs. 1-7 inclusive, 1 represents the cylindrical wall, preferably of heavy tubing, forming the outer portion of the handle of a welding blowpipe. This tubing is provided with a rear reduced threaded extension 2 on which is threaded the tail piece 3 having the connections 4 and 5 for oxygen and combustible gas respectively. The connection 4 is provided with a valve 6 by which oxygen may be supplied to a passage 7, and the connection 5 is provided with a valve 8 by which the combustible gas may be supplied to an annular chamber 9, whence it is delivered into the annular space provided between the handle tube 1 and a tube 10 located within the tube 1 and having a reduced rear end provided with an external thread by means of which it is connected to the tail piece, with its bore arranged to receive the combustible gas from the passage 9. The front end of the tube 10 projects beyond the front end of the handle tube 1 and has a reduced end, similar to the rear end and threaded into the central portion 11$^a$ of a block 11 connecting the front of the handle with the tip assembly. The central portion of the block is provided with a passage 11$^b$ which registers with the reduced delivery end of the bore of the tube 10 and is provided also with passages 11$^c$ located externally of the passage 11$^b$ and which register with the annular space formed between the tubes 1 and 10. It will be noted that the reduced threaded ends of the tube 10 are connected by outwardly flaring frusto-conical portions 10$^a$ with the body portions of the tube respectively adjacent thereto. This flaring is preferably accomplished by a swaging operation, which provides an angular step between each reduced threaded end of the tube and the body of the tube adjacent thereto. These frusto-conical steps serve to take care of the strains which are set up in the tube 10, due to the difference in expansion and contraction between the tubes 10 and 1. The outer tube 1 is subjected to more or less reflected heat during the operation of the blowpipe, while the inner tube is cooled by the passage of the oxygen therethrough, which has been expanded greatly due to its reduction in pressure from 2,000 pounds in the tank from which it is supplied to the said tube. This difference in expansion and contraction between the similar metals of which the inner and outer tubes are composed has a tendency to cause the inner tube to break at the threads, when the outer tube expands, with a consequent development of leakage of oxygen at this point into the fuel gas and the liability to produce an explosive mixture within the handle, the block 11, and the restricted passage (to be described hereinafter) through which the combustible gas is delivered into the mixing portion of the tip assembly. Due to the shape imparted to the opposite ends of the tube through the swaging operation, the swaged or tapered portions of the tube will take care of the strains due to contraction and expansion in the handle tube 1 without breaking the inner tube at the threads.

The particular construction of the tube 10, just described, not only serves to prolong the life of the handle portion of the blowpipe for the reasons stated, but also to prevent any back-fire within the handle portion by preventing the formation of an explosive mixture of combustible gas and oxygen therein produced by leakage at either or both ends of the tube 10. However, as pointed out hereinbefore, it is important to prevent, as far as possible, any back-fire from occurring in the tip assembly and, in the event of such back-fire, to limit its duration as well as the extent of propagation of the back-fire flame. I accomplish this result more particularly by the manner in which the combustible gas and the oxygen are first brought together at the inner end of the mixing duct. Generally speaking, I interpose in the path of flow of the fuel gas an injector nozzle which is so arranged with respect to the parts with which it is associated that an extremely narrow passage for the combustible gas is provided around the delivery portion of said nozzle and the velocity of the gas so delivered is increased as it approaches the point at which the oxygen is delivered thereinto from the nozzle, attaining its maximum velocity at such point. In addition, I provide other features of construction which contribute to the production of a practical and efficient blowpipe and which features of construction will be pointed out as the description proceeds.

The passage $11^b$ in the connecting block terminates in an outwardly flaring frusto-conical seat $11^d$, the said seat being engaged by the convex surface $12^a$ on the rear end of an injector nozzle 12. The injector nozzle is provided with a central bore $12^b$ which receives at its rear end the oxygen delivered through the passage $11^b$. The bore $12^b$, throughout the major portion of its length, is preferably of the same diameter as the passage $11^b$, but communicates at its front end with a restricted central bore constituting a jet orifice $12^c$, the bores $12^b$ and $12^c$ being arranged axially of the injector nozzle and the latter bore delivering oxygen axially of the passage $13^a$ provided in the rear mixing member 13 of a tip assembly which, as shown, comprises an additional tip member 20, threaded at its rear end into the front end of the member 13. The bore $12^b$ is provided with a strainer $12^d$ extending across the rear portion thereof and removably retained in place by means of a ring $12^e$.

It will be noted that the rounded or outwardly convex surface $12^a$ of the injector nozzle is carried by a rearwardly extending cylindrical portion $12^f$, which projects from a larger cylindrical portion $12^g$. In front of the cylindrical portion $12^g$, the injector body is provided with an annular cylindrical recess $12^h$; and in front of the recess, with a projection having a cylindrical outer surface $12^j$ which merges at its front or delivery end with a frusto-conical surface $12^k$ which converges toward the axial bore $12^c$ and preferably at an angle of about 45° with respect to said bore. This injector nozzle is pressed-fitted into a seat provided therefor in the rear end of the member 13, the said member having a cylindrical seat $13^b$ which is adapted to form a close fit about the cylindrical surface of the part $12^g$ of the injector, there being an annular stop shoulder $13^c$ at the front end of the seat. The rear end of the member 13 is of sufficiently smaller diameter than the portion of the connecting block 11 which surrounds the same to provide an annular distributing chamber 14 for the combustible gas flowing through the passages $11^c$; and the rear portion of the said member 13 is provided, in front of the shoulder $13^c$, with a plurality of ports $13^d$ for delivering the gas from the chamber 14 into the annular chamber provided between the inner cylindrical wall $13^e$ and the cylindrical wall of the recess $12^h$. From this annular chamber, the combustible gas is delivered through a narrow annular passage 15 which is provided between the cylindrical surface $12^j$ and the cylindrical surface $13^e$ and thence through the frusto-conical passage $14^a$ formed between the frusto-conical surface $12^k$ and the frusto-conical surface $13^f$ of the member 13. It will be noted that the rear portion of the member 13 is provided, in front of the ports $13^d$, with a cylindrical projection $13^g$, which cylindrical projection fits snugly within the front sleeve-like end portion of the connecting block 11, the front end of such portion extending forwardly beyond the said cylindrical projection, and the said projection having at its front an annular radially extending shoulder $13^h$.

Toward the rear of its front end portion, the connecting block 11 is provided with an external thread $11^e$, and a nut is threaded onto such portion, the said nut comprising an angular portion 16 adapted to receive a wrench, a cylindrical sleeve $16^a$ adapted to extend around the portion of the connecting block at the rear of the thread, the nut also being provided with an annular recess in front of the thread, this annular recess having a cylindrical wall $16^b$ which is adapted to engage the cylindrical outer surface of the front sleeve-like extension of the connecting block 11. The front of the annular recess is defined by an annular wall $16^c$, extending radially inwardly at right angles with respect to the cylindrical wall $16^b$ and as far as the outer cylindrical surface of the member 13, from which point the nut is provided with a cylindrical surface $16^d$ adapted to engage more or less snugly the cylindrical wall of the said member. At its extreme front end the nut it provided with an annular recess $16^e$, which is adapted to receive therewithin a split locking and retaining ring 17, which is inserted into an annular groove $13^j$ formed in the outer surface of the tip member 13.

In order to prevent any leakage of the combustible gas through the nut and into the air as well as to prevent any air from being drawn inwardly through said nut and entrained into the combustible gas through the action of the powerful jet of oxygen issuing through the orifice $12^c$, I provide the following packing arrangement between the front end of the connecting block and the nut:

18 denotes a packing ring of moldable fire-proof material mounted on the member 13 and capable of being compressed by a metal ring 19, the former ring abutting with its rear edge the shoulder 13$^h$ and the latter ring abutting with its front edge the shoulder 16$^c$ and having its rear edge abutting against the ring 18 and fitting closely within the annular space provided by the overhanging front extension of the connecting block. It will be evident that, by setting up the nut 16—16$^e$, the moldable ring 18 will be contracted longitudinally and expanded radially outwardly, thereby positively preventing the escape of combustible gas beyond the said ring and through the nut to the atmosphere as well as preventing the admission of air from the atmosphere through the nut into the combustible gas. Furthermore, when the nut 16—16$^e$ is set up, the tip member 13 is forced rearwardly toward the connecting block 11, and the rounded seating portion 12$^a$ of the injector is forced into such engagement with the frusto-conical seat 11$^d$ as will positively prevent the high pressure oxygen from leaking into the low pressure fuel gas chamber 14, the arrangement providing a positive seal against such leakage and compelling the oxygen to pass through the small outlet opening 12$^c$ at the delivery end of the injector. This arrangement also prevents any possibility of the fuel gas finding its way into the oxygen passage at any point except in advance of the delivery end of the last mentioned passage.

The ring 17, not only serves to hold the nut against loss from the member 13, but provides means for positively removing the said member and the injector nozzle from the connecting block 11. This removal of the mixer member 13 and the injector nozzle will be necessary whenever a tip of different capacity is employed, because each tip must have a correctly proportioned mixer and nozzle which constitute a component part of the tip assembly. The overhanging of the ring 17 by the recessed front end of the nut prevents the unintentional or accidental removal of the said ring from the groove 13$^j$ provided therefor in the mixing tip member 13. By unscrewing the nut, it will exercise a longitudinal thrust against the member 13, through the ring 17, and thus facilitate the separation of the parts 11 and 13.

Reference has been made hereinbefore to the practical elimination of back-firing within the mixing duct 13$^a$ and to the immediate extinguishing of any such back-fire in the event that it may occur. The manner in which this action is prevented will now be explained. The gas passing from the annular chamber X formed between the parts 12$^h$ and 13$^e$ to the mixing duct 13$^a$ must traverse the passages formed between the parallel cylindrical surfaces 13$^e$ and 12$^j$ and between the surfaces 13$^f$ and 12$^k$. The width of these passages is very small; in practice, each of these passages is about 10/1,000ths inch in width. Furthermore, the passage formed between the parts 12$^k$ and 13$^f$ converges toward the Venturi opening provided at the receiving end of the mixing passage 13$^a$ and, at its delivery end, this passage is only about one-third the diameter of the passage which surrounds the cylindrical part 12$^j$. With this arrangement, the gas flowing from the annular receiving chamber X is delivered to the Venturi opening at an ever-increasing velocity, reaching the maximum velocity at a point immediately prior to its impingement by the oxygen issuing from the jet orifice 12$^c$. Due to the velocity which is thus imparted to the combustible gas, there is no place within the blowpipe where the combustible gas travels at a greater speed than just prior to its admixture with the oxygen. Because of this fact, should any back-fire occur, it will not penetrate within the interior of the blowpipe to a point beyond this point of maximum velocity. Furthermore, should such back-fire occur, it will be immediately extinguished, due to the shape and size of the delivery or front end of the injector. It will be noted that this end is provided with a flat or plane face 12$^m$ extending at right angles to the axis of the jet orifice 12$^c$ and the axis of the mixing bore or chamber 13$^a$. This face is preferably five times the diameter of the orifice 12$^c$ and, as stated hereinbefore, about one-third the diameter of the cylindrical part 12$^j$. By providing this relatively large flat face which, as will be seen, is of greater area than the area of the mixing chamber 13$^a$ immediately beyond or in front of the venturi, any back-fire that may occur within the chamber 13$^a$ will strike against this flat or plane face, and will not enter the restricted passage provided therebeyond for the combustible gas, but will expend its efforts in rebounding forwardly from this face. When this occurs, the oxygen issuing from the jet 12$^c$ immediately draws in or entrains combustible gas, with the immediate production of a combustible mixture which, when it reaches the hot metal which is being welded, will be instantly lighted. The succession of the back-fire by a new flame at the operating end of the blowpipe tip is almost instantaneous, thereby preventing the metal from being cooled and with like prevention of any impairment of the quality of the weld being formed.

It will be noted that the rear end of the nut 16—16$^e$ projects a considerable distance beyond the rear end of the injector nozzle, thereby protecting its seating portion 12$^a$ from injury when the member 13 and the nut are disassembled from the handle connecting block. The seat is thus protected against nicking or marring in any manner, thereby insuring a proper seating for the nozzle, at least insofar as the mixing member 13 is concerned.

It will be noted further that the corresponding seat 11$^d$ in the block 11 is set back or recessed from the forward sleeve-like extension of the said block, whereby this seat also is protected against mutilation. Thus, under any ordinary incidents of use, the mixer portion of the tip assembly can be connected to the handle with positive assurance that an effective leak-proof seat will be provided between the rear end of the injector nozzle and the seat provided therefor in the handle connection.

In Figs. 8 to 11 there is shown a modification of my invention wherein the injector nozzle is incorporated in the head of a cutting blowpipe.

Referring to these views, 21 denotes the blowpipe head, the same being provided at its rear end with connections 22, 23 and 24 for the pipes 22$^a$, 23$^a$ and 24$^a$, respectively, which convey preheating oxygen, cutting oxygen, and combustible gas respectively to the said head. From the connection 22, a port 22$^b$ delivers the preheating oxygen to a chamber 25 which is provided in the threaded rear portion of a bore extending forwardly from the rear end of the head, said chamber being formed between a plug 26 threaded into the rear end of said bore and a locking ring 27 threaded into the said bore in front of said plug, the said locking ring retaining within the front reduced portion of said bore an injector nozzle 28, which is substantially identical with the injector nozzle 12 described hereinbefore.

The nozzle 28 is mounted in the smooth front portion of the bore 29 which portion is of smaller diameter than the threaded rear portion of said bore. The nozzle is provided with an annular radially extending shoulder 28ª adapted to engage a corresponding seat formed at the junction of the front and rear portions of the bore 29 and with a cylindrical surface 28ᵇ adapted to fit snugly within the rear end of the front portion of said bore. It is provided with a cylindrical annular recess 28ᶜ, similar to the recess 12ʰ, and with a cylindrical surface 28ᵈ in front of the said recess and with a frusto-conical surface 28ᵉ in front of the cylindrical surface, the surfaces 28ᵈ and 28ᵉ corresponding respectively to the surfaces 13ᵉ and 13ᶠ of Fig. 2. It is also provided with a central bore 28ᵍ, corresponding to the bore 12ᵇ, in Fig. 2 and with a strainer 28ʰ and a locking ring 27, corresponding to the like parts in Fig. 2; also with a central restricted delivery or jet orifice 28ᵏ corresponding to the orifice 12ᶜ.

The connection for combustible gas communicates by a port 24ᵇ with the annular cylindrical chamber Y formed between the recess 28ᶜ and the surrounding portion of the bore 29; and this combustible gas is mixed with oxygen supplied through the jet 28ᵏ in the same manner as is the case with the welding-pipe construction shown and described hereinbefore. The preheating mixture is delivered through a mixing passage 30 to a downwardly extending port at the front of the blowpipe head, whence it is delivered to an annular passage 32 formed in the bottom of the head. The preheating mixture is delivered thence through preheating passages 33ª in the tip 33, the said tip being secured to the lower end of the blowpipe head, by means of a nut 34. The cutting oxygen is delivered from the pipe 23ª and connections 23 through a passage 23ᵇ in the blowpipe head to a downwardly extending passage 35 in said head, whence it is delivered to the central bore 36 of the blowpipe.

It will be understood that, so far as the passages leading to the jet orifice 28ᵏ are concerned, the width of these passages will be the same as is the case with the injector nozzle and mixer described hereinbefore and that this arrangement, together with the construction of the nozzle, will prevent back-firing beyond the nozzle and will cause the immediate extinguishment of any such back-fire in the manner described in connection with the preceding form of my invention.

Having thus described my invention, what I claim is:

1. In a blowpipe, a member having a mixing passage therein and means for discharging into said passage a mixture of oxygen and a combustible gas, the said means comprising an injector nozzle having a bore adapted to direct oxygen under pressure axially of said mixing passage, the said nozzle being provided with an extended surface at the front or delivery end thereof surrounding the said orifice and extending substantially at right angles with respect thereto and with a rearwardly flaring frusto-conical surface extending from the first mentioned surface, the rear end of the frusto-conical surface merging with a cylindrical surface extending rearwardly from said frusto-conical surface and having its rear end spaced from the rear end of said nozzle, the said member having a frusto-conical surface and a cylindrical surface extending rearwardly from the second frusto-conical surface and terminating short of the rear end of said nozzle and forming with the corresponding surfaces of the nozzle communicating narrow passages, the passage formed between the frusto-conical surfaces being of uniform width throughout its extent, means including a passage for supplying oxygen under high pressure to the rear of the central bore of the nozzle, means for supplying combustible gas through the passage provided between the cylindrical and frusto-conical portions of the nozzle and the member having the mixing passage, the area of said extended surface and the cross-sectional areas of the passages between the frusto-conical surfaces and cylindrical surfaces being so proportioned as to prevent propagation of flame from the mixing passage into the last mentioned passages, and means engaging the rear end of said nozzle and providing a positive seal between the passages surrounding the aforesaid frusto-conical and cylindrical portions of the nozzle and the rear end of said nozzle.

2. In a blowpipe, a member having a mixing passage therein, the said mixing passage extending forwardly from a chamber formed in the rear of the said member, the said chamber having an outwardly and rearwardly flaring frusto-conical wall merging at its front end with the said mixing passage and a cylindrical wall extending rearwardly from said frusto-conical wall, there being ports having their inner ends extending through the said cylindrical wall and their outer ends extending through the outer wall of the said member, the cylindrical portion of the said chamber having at the rear of said ports a radially outwardly extending shoulder constituting a stop and the rear end of the said member extending beyond said stop, and an injector nozzle having a central bore and a radially outwardly extending wall adapted to engage the said shoulder and having a rear portion adapted to fit snugly within the rear portion of the said mixing member, the said nozzle having an annular recess adapted to receive combustible gas supplied through the said ports and provided in front of such recess with a cylindrical wall and and a frusto-conical wall forming narrow passages with the corresponding cylindrical and frusto-conical walls of the said mixing chamber.

3. In a blowpipe, a member having a mixing passage therein, the said mixing passage extending forwardly from a chamber formed in the rear of the said member, the said chamber having an outwardly and rearwardly flaring frusto-conical wall merging at its front end with the said mixing passage and a cylindrical wall extending rearwardly from said frusto-conical wall, there being ports having their inner ends extending through the said cylindrical wall and their outer ends extending through the outer wall of the said member, the cylindrical portion of the said chamber having at the rear of said ports a radially outwardly extending shoulder constituting a stop and the rear end of the said member extending beyond said stop, and an injector nozzle having a central bore and a radially outwardly extending wall adapted to engage the said shoulder and having a rear portion adapted to fit snugly within the rear portion of the said mixing member, the said nozzle having an annular recess adapted to receive combustible gas supplied through the said ports and provided in front of such recess with a cylindrical wall and a frusto-conical wall forming narrow passages with the corresponding cylindrical and frusto-conical walls of the said mixing chamber, and the said nozzle having a rearward extension surrounding the bore thereof and provided with an outwardly convex surface adapted to engage a tapered seat thereby to form a seal against the escape of oxygen supplied to the central bore.

4. In a blowpipe, a member having a mixing passage therein, the said mixing passage extending forwardly from a chamber formed in the rear of the said member, there being radial ports extending through the rear portion of the chamber wall, the portion of the said chamber at the rear of the ports having a radially outwardly extending shoulder constituting a stop and the rear end of the said member extending beyond said stop, and an injector nozzle having a radially outwardly extending wall adapted to engage the said shoulder and having a rear portion adapted to fit snugly within the rear portion of the said mixing member, the said nozzle having an annular recess adapted to receive combustible gas supplied through the radial ports and provided in front of such recess with a narrow passage communicating with such recess and adapted to discharge combustible gas in operative relation to the delivery end of the injector bore.

5. In a blowpipe, the combination of a member having a mixing passage communicating at its rear with a chamber, an injector nozzle in said chamber and having a central bore for oxygen and forming with said chamber means for delivering combustible gas into the mixing passage at the front of the said nozzle, the said nozzle having a projection extending rearwardly therefrom beyond the chamber in which it is mounted, the said extension having an outwardly convex surface surrounding the bore thereof, a member having a central passage for oxygen and an outwardly flaring surface at the front or delivery end of said passage adapted to be engaged by the convex surface on the rear end of the said nozzle and also having one or more passages for delivering combustible gas to said chamber for delivery thence into said mixing passage, and means for connecting the said members and forcing the said surfaces into engagement with each other, the said means comprising an annular projection on the rear portion of the first mentioned member, a sleeve extension on the front of the second member having an external thread thereon and surrounding the said projection and extending forwardly therebeyond, a nut slidably mounted on the first member and having an internally threaded sleeve projection receiving the front of the sleeve extension of the second member and threaded thereon, the said nut having a wall extending radially outwardly from the first mentioned member and constituting the rear wall of the sleeve portion thereof, a ring mounted on the first mentioned member engaged by said rear wall, and a deformable ring interposed between the rear of said ring and the said annular projection and overhung by the front portion of the sleeve extension of the second member whereby, on setting up the nut, the said deformable ring will be compressed longitudinally and expanded radially thereby to prevent passage of gaseous fluid around the said annular projection.

6. In a blowpipe, the combination of a member having a mixing passage communicating at its rear with a chamber, an injector nozzle in said chamber and having a central bore for oxygen and forming with said chamber means for delivering combustible gas into the mixing passage at the front of the said nozzle, the said nozzle having a projection extending rearwardly therefrom beyond the chamber in which it is mounted, the said extension having an outwardly convex surface surrounding the bore thereof, a member having a central passage for oxygen and an outwardly flaring surface at the front or delivery end of said passage adapted to be engaged by the convex surface on the rear end of the said nozzle and also having one or more passages for delivering combustible gas to said chamber for delivery thence into said mixing chamber, and means for connecting the said members and forcing the said surfaces into engagement with each other, the said means comprising an annular projection on the rear portion of the first mentioned member, a sleeve extension on the front of the second member having an external thread thereon and surrounding the said projection and extending forwardly therebeyond, a nut slidably mounted on the first member and having a sleeve extension adapted to receive therewithin the front extension of the second member, the said sleeve extension having therein a front cylindrical surface adapted to engage the outer cylindrical surface of the front end of the extension of the second member and having at the rear of such cylindrical surface a thread adapted to engage the external thread on such second member, the said nut having a wall defining the front of the chamber formed within the sleeve extension thereof, a ring mounted on the first member and adapted to be engaged by the said wall and a deformable ring also mounted on the first mentioned member at the rear of the said ring and interposed between the first ring and the annular extension and within the front portion of the extension of the second member whereby, on setting up the nut, the second ring will be expanded radially into engagement with the overhanging portion of the extension of the second member.

7. In a blowpipe, the combination of a member having a mixing passage communicating at its rear with a chamber, an injector nozzle in said chamber and having a central bore for oxygen and forming with said chamber means for delivering combustible gas into the mixing passage at the front of the said nozzle, a member having a central passage adapted to deliver oxygen into the bore of the said nozzle and also having one or more passages for delivering combustible gas to said chamber for delivery thence into said mixing passage, and means for connecting the said members to prevent premature mingling of oxygen and combustible gas and of combustible gas and air, the said means comprising an annular projection on the rear portion of the first mentioned member, a sleeve extension on the front of the second member having an external thread thereon and surrounding the said projection and extending forwardly therebeyond, a nut slidably mounted on the first member and having a sleeve extension adapted to receive therewithin the front extension of the second member, the said sleeve extension having therein a front cylindrical surface adapted to engage the outer cylindrical surface of the front end of the extension of the second member and having at the rear of such cylindrical surface a thread adapted to engage the external thread on such second member, the said nut having a wall defining the front of the chamber formed within the sleeve extension thereof, a ring mounted on the first member and adapted to be engaged by the said wall and a deformable ring also mounted on the first mentioned member at the rear of the said ring and interposed between the first ring and the annular extension and within the front portion of the extension of the second member whereby on setting up the nut, the second ring will be expanded radially into engagement with the overhanging portion of the extension of the second member.

8. In a blowpipe, a member having a mixing passage and provided with a chamber in the rear thereof with which the said mixing passage communicates, an injector nozzle mounted in the said chamber and having a central bore therethrough and providing with the said chamber means for delivering a combustible gas into the mixing passage, and means for connecting the said member to a member having passages for oxygen and a combustible gas, the said means comprising a nut slidably mounted on the rear end of the mixing member and having its rear end projecting beyond the rear end of the injector nozzle thereby to shield such end, and means for retaining the said nut on the said mixing member.

9. In a blowpipe, a member having a mixing passage and provided with a chamber in the rear thereof with which the said mixing passage communicates, an injector nozzle mounted in the said chamber and having a central bore therethrough and providing with the said chamber means for delivering a combustible gas into the mixing passage, and means for connecting the said member to a member having passages for oxygen and a combustible gas, the said means comprising a nut slidably mounted on the rear end of the mixing member and having a chamber in the front portion thereof and having its rear end projecting beyond the rear end of the injector nozzle thereby to shield such end, the rear portion of the mixing member having an annular projection, a radially compressible washer within the front portion of the nut chamber and adapted to be compressed against said annular projection, a relatively rigid ring interposed between the front of the said washer and the front wall of the chamber of the said nut, the said mixing member having an annular recess, and a split ring mounted in said recess, the front of the said nut having an annular recess adapted to receive the said ring.

10. In a blowpipe, a mixing member having a chamber in the rear end thereof and an injector nozzle in said chamber, the rear portion of said injector nozzle having a seat-engaging portion surrounding the bore thereof, and a member having a central passage for oxygen adapted to register with the bore of the injector and provided with an outwardly flaring seat surrounding said central passage and adapted to be engaged by the seat-engaging portion of the nozzle and also having one or more passages for combustible gas adapted to deliver such gas to the chamber containing the injector, the second member having a sleeve extension projecting beyond the flaring seat by means of which it is adapted to be connected to the mixing member.

11. In a blowpipe, the combination of a tip assembly, a tail block having connections for oxygen and a combustible gas, a handle interposed between the said tail block and the tip assembly and comprising an outer tubular member connected to the said tail block and the tip assembly and a tube within the said outer member and having at each end a reduced threaded extension for connect on respectively with the tail block and the tip assembly, the said threaded extensions being connected with the adjacent portions of the body of the inner tube by outwardly flaring portions each forming an abrupt angle with its threaded extension.

12. In a blowpipe, the combination of a tip assembly, a tail block having connections for oxygen and a combustible gas, and a handle interposed between the tip assembly and the tail block, the said handle comprising an outer tubular member adapted to be connected to the tip assembly and the tail block and an inner tubular member for oxygen also adapted to be connected to the tip assembly and the tail block, the inner tubular member having at each end thereof a reduced threaded extension, which threaded extension is connected with the body of such tube by a swaged abrupt outwardly extending angular portion.

LORN CAMPBELL, Jr.